July 15, 1958  A. C. HOVEN ET AL  2,843,335
AUTOMATIC REEL
Filed March 14, 1956

INVENTORS
Alfred C. Hoven
Walter E. Nordmark
BY John S. Braddock
ATTORNEY

United States Patent Office 2,843,335
Patented July 15, 1958

2,843,335

AUTOMATIC REEL

Alfred C. Hoven and Walter E. Nordmark, Grand Rapids, Mich., assignors to American Seating Company, Grand Rapids, Mich., a corporation of New Jersey Application March 14, 1956, Serial No. 571,411

5 Claims. (Cl. 242—107.4)

The present invention relates to automatic reels of the type used to take up slack in safety belts and harnesses for vehicle occupants and adapted to lock so as to restrain the occupant against forward movement in the event of a crash.

The primary objects of the invention are to provide an improved reel of the character indicated which normally winds in any slack in a cable, web or similar elongated flexible element such as might be attached to or be a part of a safety restraining device for a vehicle occupant; to provide such a reel which is readily yielding under normal conditions to permit unwinding of the flexible element, thus affording full freedom of movement to the vehicle occupant; to provide such a reel which when used in conjunction with a safety restraining device for a vehicle occupant will automatically lock whenever the flexible element is suddenly jerked as would occur in the event the vehicle crashed, thus to prevent unwinding of the flexible element so as to restrain the occupant against being thrown forwardly in the vehicle and possibly injured or killed; and in general to provide such an automatic reel which is simple in construction, effective in use, and reasonably economical in manufacture.

An illustrative embodiment of the invention is shown in the accompanying drawings, wherein.

Figure 2:
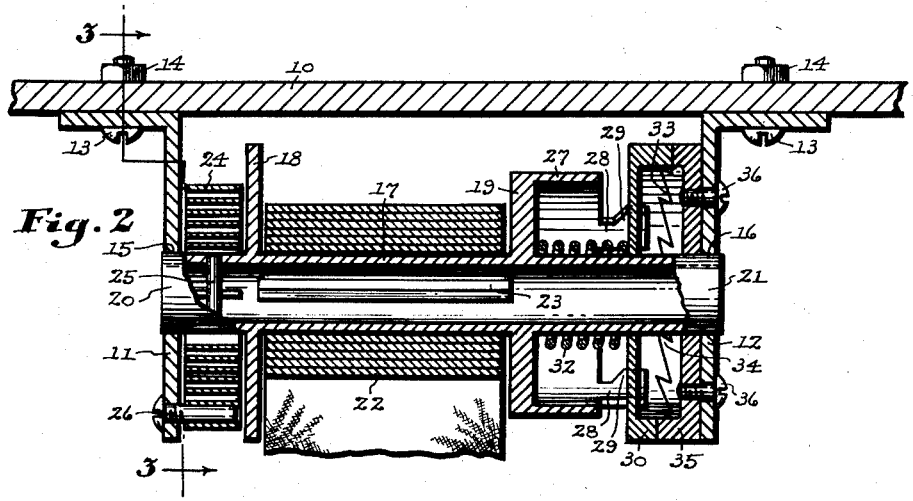
Figure 2 is a horizontal sectional view of the reel in locked condition, the plane of section being indicated by the line 2—2 of Figure 1.
Figure 3:
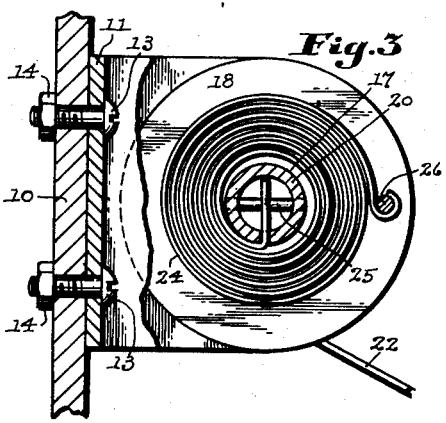
Figure 3 is a vertical sectional view of parts thereof taken on line 3—3 of Figure 2.

Referring now in detail to this drawing, the automatic reel there shown is mounted upon a base 10, which may constitute the upper part of an airplane pilot's chair-back and is thus shown fragmentarily. Spaced angle-bracket supports 11, 12 are mounted on the base 10 as by means of bolts 13 having nuts 14 and the supports 11, 12 are provided with aligned bearings 15, 16 respectively therein (see Figure 2). A spool generally designated 17 has spaced circular flanges 18, 19 thereon, a relatively short spindle 20 journalled in the bearing 15 of the support 11 and a longer spindle 21 journalled in the bearing 16 of the support 12.

An elongated, flexible element here shown as a fabric web 22 is connected to the spool 17 between the flanges 18, 19, said web 22 passing through an opening into the hollow center of the spool and having a clip 23 secured thereon by means of which the web 22 is secured to the spool. The web is thus adapted to be wound onto the spool and unwound therefrom. In the application of the reel to, for example, an airplane pilot's chair, the flexible web 22 may be connected to or even be a part of the pilot's safety shoulder harness, passing from the reel downwardly over the pilot's shoulder and connected at its lower end to the pilot's lap-belt (not shown).

Between the support 11 and the circular flange 18 on the spool 17 there is disposed a spiral spring 24 circumscribing the shorter spindle 20 of the spool. The inner end of the spring 24 passes through a slot into the hollow center of the spool and is secured therein by means of a pin 25, and the outer end of the spring 24 is secured to a pin 26 threadedly mounted in the support 11. This spring 24 normally, yieldingly urges the spool in a winding direction for taking up any slack in the flexible web 22 or shoulder harness strap.

Figure 4:
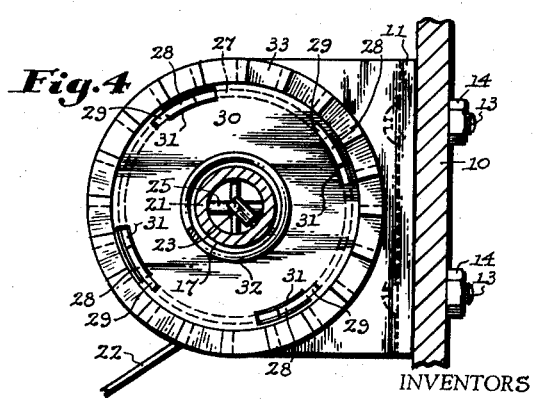
Figure 4 is a vertical sectional view of parts thereof taken on line 4—4 of Figure 1.

The flange 19 adjacent the longer spindle 21 of the spool 17 has a peripheral rim 27 which extends outwardly toward the support 12 and terminates in a plurality (four, as shown) of circumferentially spaced latching hooks 28 having enlarged keeper portions 29 at their outer ends. An annular locking member 30 is longitudinally slidably mounted on the longer spindle 21 between the flange 19 on the spool 17 and the support 12. This locking member 30 is provided with arcuate slots 31 therein (see Figure 4) into which extend the latching hooks 28 which permit limited rotation of the locking member 30 relative to the spindle 21 from an inner position of engagement behind the latches' keeper portions 29 (see Figure 1) to a position disengagement from said keeper portions 29. When so disengaged from the latching hooks 28 the locking member 30 is urged outwardly (see Figure 2) by a helical spring 32 circumscribing the spindle 21 between the flange 19 on the spool and the locking member 30. When in its outermost position a ratchet ring 33 on the locking member enters into interlocking ratchet-engagement with a complementary ratchet ring 34 on a member 35 secured to the support 12 as by means of screws 36.

*Operation*

Figure 1:
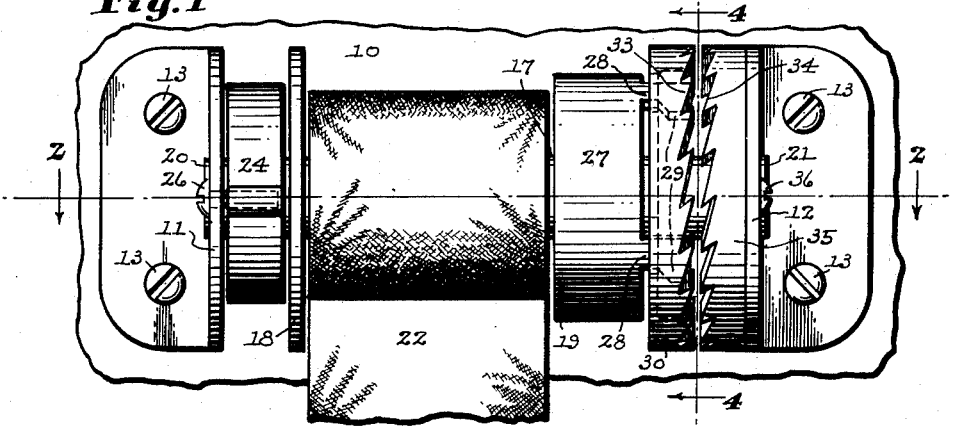
Figure 1 is a front elevational view of the new automatic reel in unlocked condition.

During normal operation of the reel, or during normal travel conditions of any vehicle in which the reel may be installed, the locking member 30 is in its position of engagement behind the keeper portions 29 of the latching hooks 28 on the spool, out of ratchet-engagement with the ratchet ring 34 on the support 12, as seen in Figure 1. During such normal operation the spiral spring 24 urges the spool 17 in a winding direction for taking up any slack in the flexible web 22, but the spring 24 will yield to permit ready paying out of the web 22. Also during this normal winding and unwinding rotation of the spool, the locking member 30 rotates with the spool. However, when an abrupt jerk is applied to the flexible web 22, as it would be in the event of a crash of a vehicle in which the web 22 formed a part of an occupant's shoulder harness, the locking member 30 will by its own inertia "lag behind" the spool thus effecting limited rotation of the locking member relative to the spool. This limited relative rotation unlatches the locking member 30 from the latching hooks 28 on the spool, whereupon the helical spring 32 forces the locking member outwardly into interlocking ratchet engagement with the ratchet ring 34 on the base support 12. When so engaged the locking member and the spool are prevented from rotation in their unwinding direction to pay out the web thus preventing the chair occupant from being thrown forward, but the locking member and spool are permitted to rotate in the opposite or winding direction for taking up any slack in the cable.

Manual control means (not shown) may if desired be used in connection with the automatic reel, and by such means the reel might be locked or unlocked from a point distant from the reel proper through cable connections.

It will thus be seen that the invention provides a simple but effective automatic reel for use in any situation calling for a reel which will lock against paying out in response to a sudden jerk on the reeled element, and while but one specific embodiment of the invention has been herein shown and described, it will be understood that numerous details may be altered or omitted without departing from the spirit of the invention as the same is defined by the following claims.

We claim:

1. In an automatic reel: a base; a spool rotatably mounted on the base and having a spindle; an elongated flexible element connected to the spool and adapted to be wound onto the spool and unwound therefrom; means for normally yieldingly urging the spool in a winding direction; a detent on the base; a locking member mounted on the spindle for rotation therewith, for limited rotation relative thereto and for sliding movement thereon to positions of engagement with and disengagement from said detent; latch means on the locking member and the spool for maintaining said locking member in its position of disengagement from said detent, said latch means being releasable upon the occurrence of said limited relative rotation between the spindle and the locking member to permit sliding movement of the locking member to its position of engagement with the detent, and said limited relative rotation being effected by the locking member's own inertia in response to an abrupt jerk on the flexible element and consequent sudden urging of the spindle in an unwinding direction.

2. An automatic reel according to claim 1 characterized by having the detent in the form of a ratchet ring on the base, and by having a complementary ratchet ring on the locking member which when engaged with the ratchet ring on the base prevents rotation of the locking member and the spool in their unwinding direction while permitting rotation of the locking member and the spool in their winding direction.

3. In an automatic reel; a base; a spool rotatably mounted on the base and having spaced circular flanges thereon and a spindle at one end thereof; an elongated flexible element connected to the spool between the flanges and adapted to be wound onto the spool and unwound therefrom; means for normally yieldingly urging the spool in a winding direction; one of the circular flanges on the spool having a peripheral rim extending outwardly in the direction of the spindle and terminating in circumferentially spaced latching hooks having enlarged keeper portions at their outer ends; a detent on the base near the spindle; an annular locking member longitudinally slidably mounted on the spindle, said locking member having arcuate slots therethrough into which extend said latching hooks, said latching hooks permitting limited rotation of the locking member relative to the spindle from an inner position of engagement behind their keeper portions and to a position of disengagement therefrom, spring means for urging the locking member outwardly upon disengagement of the locking member from said latching hooks, said limited rotation of the locking member relative to the spindle being effected by the locking member's inertia when the flexible element is abruptly jerked in its unwinding direction; and means on the locking member adapted to engage said detent when the locking member is forced outwardly to prevent rotation of the locking member and the spool in an unwinding direction.

4. In an automatic reel; a base; a spool rotatably mounted on the base and having spaced circular flanges thereon and a spindle at one end thereof; an elongated flexible element connected to the spool between the flanges and adapted to be wound onto the spool and unwound therefrom; means for normally yieldingly urging the spool in a winding direction; one of the circular flanges on the spool having a peripheral rim extending outwardly in the direction of the spindle and terminating in circumferentially spaced latching hooks having enlarged keeper portions at their outer ends; an annular locking member longitudinally slidably mounted on the spindle, said locking member having arcuate slots therethrough into which extend said latching hooks, said latching hooks permitting limited rotation of the locking member relative to the spindle from an inner position of engagement behind their keeper portions and to a position of disengagement therefrom, spring means for urging the locking member outwardly upon disengagement of the locking member from said latching hooks, said limited rotation of the locking member relative to the spindle being effected by the locking member's inertia when the flexible element is abruptly jerked in its unwinding direction; and complementary ratchet rings on the locking member and the base adapted to interlock when the locking member is forced outwardly to prevent rotation of the locking member and the spool in their unwinding direction while permitting rotation of the locking member and the spool in their winding direction.

5. In an automatic reel: a base; spaced supports mounted on the base and provided with aligned bearings therein; a spool disposed between the supports and provided at its opposite ends with spindles journalled in said bearings, said spool having spaced circular flanges thereon; a flexible web connected to the spool between the flanges and adapted to be wound onto the spool and unwound therefrom; a spiral spring disposed between one of said flanges and the adjacent support and having its inner and outer ends connected to the adjacent spindle and the adjacent support respectively whereby the spool is normally yieldingly urged in a direction for winding the web thereon; the other of said flanges having a peripheral rim extending outwardly toward the other support and terminating in circumferentially spaced latching hooks having enlarged keeper portions at their outer ends; an annular locking member longitudinally slidably mounted on the spindle between said other flange and said other support, said locking member having arcuate slots therethrough into which extend said latching hooks; a helical spring circumscribing said spindle between said other flange and the locking member for normally urging the locking member outwardly, said latching hooks permitting limited rotation of the locking member relative to the spindle from an inner position of engagement behind their keeper portions and to a position of disengagement therefrom in which latter position the helical spring forces the locking member outwardly, said limited rotation of the locking member relative to the spindle being effected by the locking member's inertia when the web is abruptly jerked in its unwinding direction; and complementary ratchet rings on the locking member and the adjacent support adapted to interlock when the locking member is forced outwardly to prevent rotation of the locking member and the spool in their unwinding direction while permitting rotation of the locking member and the spool in their winding direction.

References Cited in the file of this patent

UNITED STATES PATENTS 2,434,119    Nordmark _____ Jan. 6, 1948

FOREIGN PATENTS 741,628    Great Britain _____ Dec. 7, 1955